Dec. 24, 1929.  G. F. FISHER  1,740,583
AUTOMATIC ANIMAL TRAP
Filed June 11, 1928   3 Sheets-Sheet 1
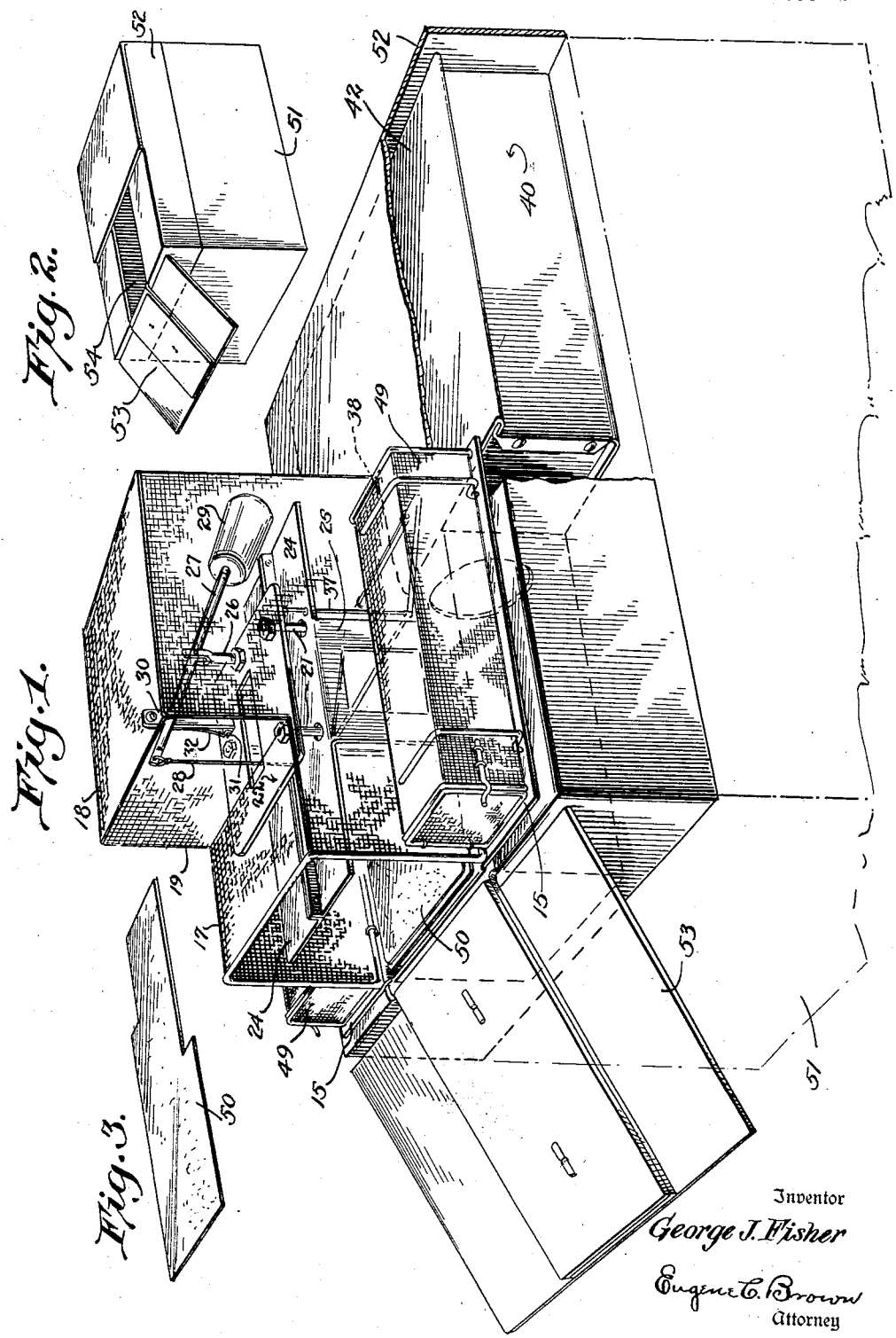
Inventor
George J. Fisher
Eugene C. Brown
Attorney Dec. 24, 1929.  G. F. FISHER  1,740,583
AUTOMATIC ANIMAL TRAP
Filed June 11, 1928  3 Sheets-Sheet 2
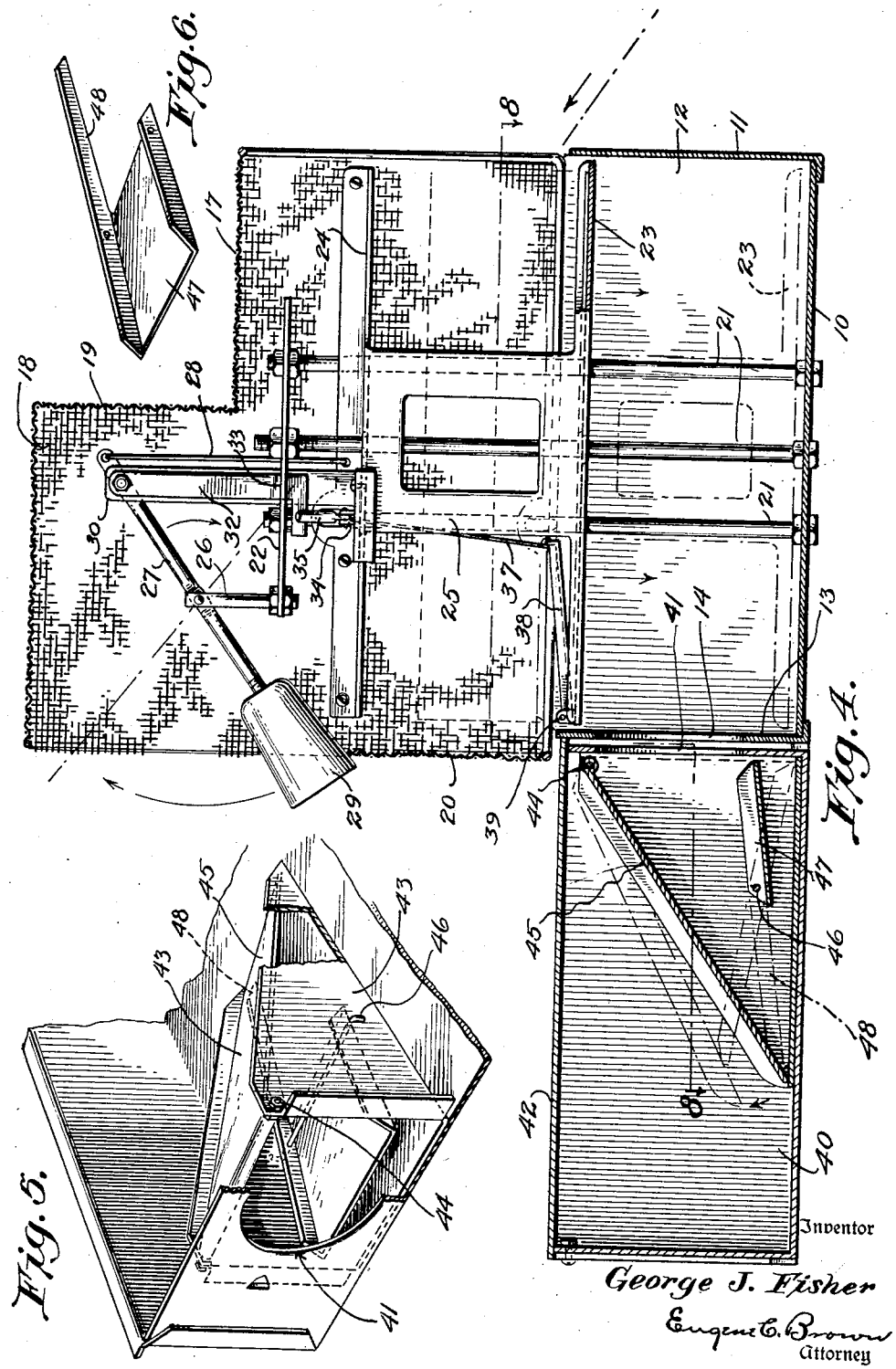

Dec. 24, 1929.  G. F. FISHER  1,740,583
AUTOMATIC ANIMAL TRAP
Filed June 11, 1928   3 Sheets-Sheet 3

Inventor
George J. Fisher
Eugene C. Brown
Attorney

Patented Dec. 24, 1929

1,740,583

UNITED STATES PATENT OFFICE

GEORGE F. FISHER, OF OKLAHOMA CITY, OKLAHOMA

AUTOMATIC ANIMAL TRAP

Application filed June 11, 1928. Serial No. 284,415.

This invention relates to animal traps and has special reference to an improvement in the type of animal trap shown and described in my prior Patent Number 1,546,976, dated July 21, 1925.

Among the objects of this invention is to provide a novel arrangement wherein the counterbalancing of the elevator cage by a sliding door as used in my prior application will be eliminated; to provide for an improved latching means to hold the elevator cage normally raised; to provide for improved means to keep the trapped animals in a final receiving compartment and other objects which will appear hereinafter.

The invention will now be described in detail, particularly pointed out in the claims and illustrated in the drawings, wherein:

Figure 1 is a perspective view of a complete trap and its support with the trap set up ready for operation.

Figure 2 is a perspective view of the packing box for the trap which is used in the setting up thereof.

Figure 3 is a perspective view of a certain replaceable or renewable floor mat or strip as used herewith.

Figure 4 is a vertical section taken longitudinally through the trap.

Figure 5 is a perspective view of the arrangement of check door for keeping the trapped animals from escaping from the final chamber of the trap.

Figure 6 is a perspective view of a treadle used in connection with the parts shown in Figure 5, the treadle being removed from the remainder of these parts.

Figure 7:
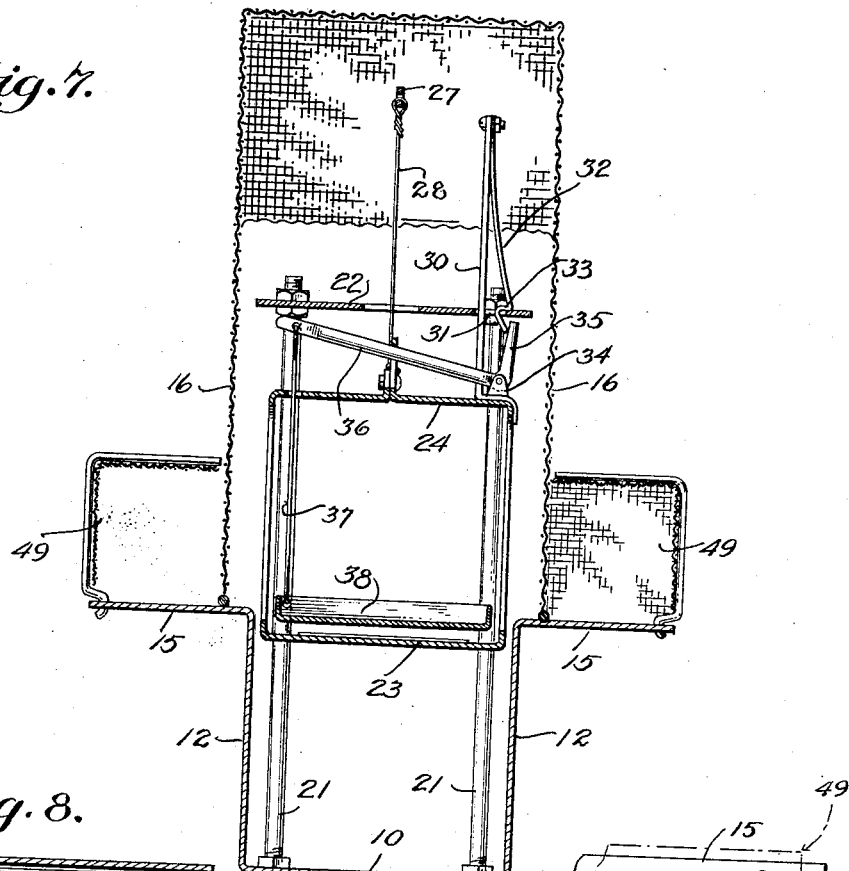
Figure 7 is a transverse section through the trap.
Figure 8:
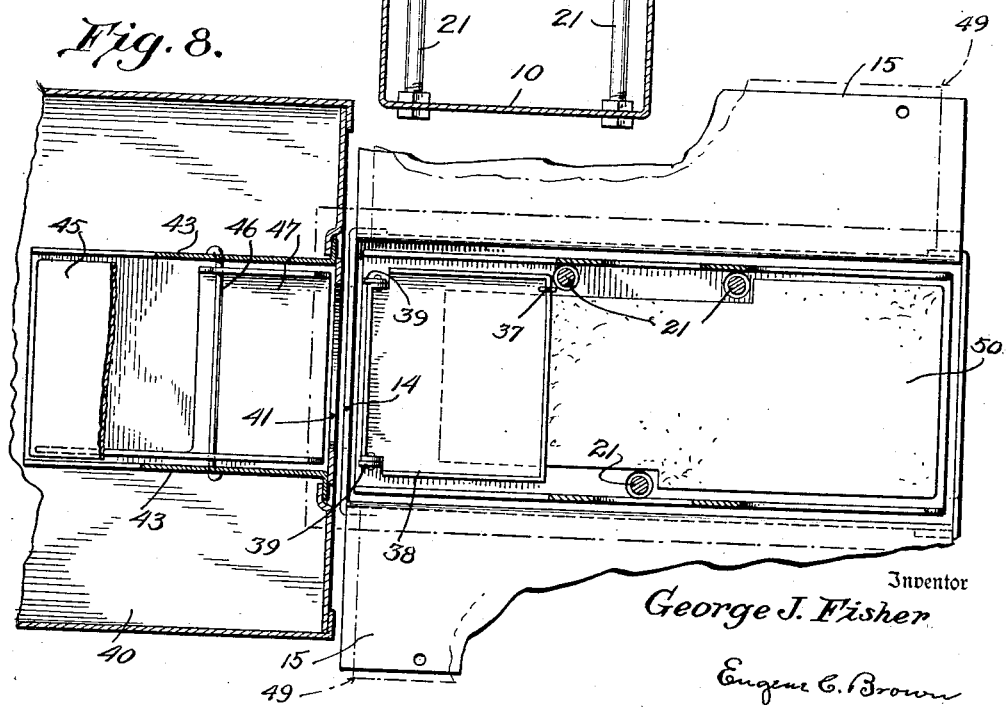
Figure 8 is a section on the line 8—8 of Figure 4.

In the embodiment of the invention herein illustrated the trap has a main portion or cage having a lower part provided with a bottom 10, front end wall 11, side walls 12 and a rear end wall 13 having a door opening 14 therein. This bottom portion is open at the top and is preferably made from sheet metal such as tin or the like. The walls 12 having at their top edges lateral flanges 15 and on these lateral flanges is built a reticulated cage portion open at the bottom and having side walls 16. This cage portion is also open at the front but the front end is of less height than the rear end and is provided with a top wall 17 while the rear end is provided with a top wall 18, the space between these top walls being closed by a front wall 19. Also at the lower part of the rear end there is provided a rear wall 20, the upper part of this end being left open. Extending upwardly from the bottom 10 are guide and supporting posts 21, one of these posts being located at one side of the trap while the other posts are located at the opposite side thereof. Mounted on the upper end of these posts is a platform 22 and slidable vertically on the posts is an elevator cage having a floor 23 and top 24 connected by side members 25. This elevator cage is of such height that when depressed so that it is in its lowermost position the floor 23 lies close to the bottom 10 while the top 24 is just below the upper edge of the imperforate lower portion of the main cage. Mounted on the platform 22 is a post 26 and a counterbalance lever 27 is pivoted intermediate its ends at the upper end of this post, the lever being connected to the elevator cage by a link 28 at one end and having its other end provided with an adjustable counterbalance weight 29. Extending up from the top 24 of the cage is a standard 30 which passes through an opening 31 and to the upper end of this standard is secured one end of a leaf spring 32 which projects through the opening 31 and has an angled portion 33 forming a latch and arranged to rest on top of the platform 22 upon the elevator rising to its highest position. By means of this latch downward movement of the elevator is prevented so long as the latch is engaged as shown in Figure 7. In order to disengage this latch at the proper time there is fixed to the top 24 a bracket 34 to which is pivoted the angled portion of a bellcrank lever having an upwardly projecting short arm 35 positioned to engage and free the latch 33 when its transversely extending longer arm 36 is drawn downwardly. This arm 36 is connected by a link 37 with a treadle 38 pivoted to brackets 39 at the rear of the elevator floor as can be seen in Figure 4.

The rear cage or storage compartment is a simple rectangular casing 40 having at its front end an opening 41 which registers with the opening 14 when the two parts are placed in operative position. The casing 40 is provided with a sliding top 42. Within this casing at each side of the opening 41 is a triangular partition wall 43 with the base of the triangle resting against the front wall of the casing. Across the upper part of this triangle extends a pivot rod 44 whereto is hinged the upper front edge of an inclined door flap 45 which rests between the walls 43. Centrally of the lower part of these walls 43 a pivot rod 46 extends across the space between the walls and on this rod is pivoted the rear portion of a treadle 47 which has an arm 48 extending back beneath the rear portion of the door flap 45.

On each side of this trap is mounted a bait receiving reticulated box 49 which is practically the same as that shown in my prior patent. Also on the floor 23 there is provided a false floor or mat 50 of paper or the like so that after the trap has been used this paper may be renewed and thus assist in keeping out the odor of mice.

The trap is packed in a carton 51 having a top portion 52 which is about the depth of the lower portion of the main trap or cage. This top 52 is cut and slotted to provide a hinge flap 53 which forms the runway for the trap.

When in use the storage or rear trap 40 is placed on the floor or in other suitable position and the cover 52 placed over it in such manner as to leave the opening 54 clear for the insertion of the lower part of the main cage, the runway 53 being dropped as shown in Figure 1. The main cage is now inserted and this brings the openings 14 and 41 into registry and the parts in proper position for use. Bait is now placed in the bait compartment 49 and the trap is ready for service. In service the animal passes up the runway 53 and into the elevator. In passing back in the elevator cage he steps on the treadle 38, actuates the bellcrank, trips the latch and the elevator descends. As the elevator reaches the bottom he endeavors to escape through the openings 14 and 41 and thus steps on the treadle 47 which raises the door flap 45 so that he apparently sees a way of escape underneath this door flap. He, therefore, passes under the door flap into the storage or rear cage 40 whereupon the flap drops and he cannot again get out. At the same time that this has been done the counterbalance 29 has raised the elevator and the latch 32 has caught ready for a second operation.

Having thus described the invention, what is claimed as new, is:

1. A rat trap consisting of a cage like outer structure having an inlet opening at its front, the rear end of said cage having an outlet opening at a lower level than the inlet opening, an elevator cage vertically movable between the levels of said openings in the outer structure, a counterbalance normally holding the cage raised, a latch carried by said cage, a fixed member wherewith the latch engages upon the cage being raised whereby to restrain the cage from downward movement, a bellcrank pivoted on said cage and having one end engaging the latch to move the same to release position, a treadle pivoted on the floor of the cage, and a link connecting said treadle and bellcrank to operate the latter as the treadle is depressed.

2. A rat trap consisting of a cage like outer structure having an inlet opening at its front, the rear end of said cage having an outlet opening at a lower level than the inlet opening, an elevator cage vertically movable between the levels of said openings in the outer structure, a counterbalance normally holding the cage raised, a latch carried by said cage, a fixed member wherewith the latch engages upon the cage being raised whereby to restrain the cage from downward movement, a bellcrank pivoted on said cage and having one end engaging the latch to move the same to release position, a treadle pivoted on the floor of the cage, a link connecting said treadle and bellcrank to operate the latter as the treadle is depressed, a rear cage portion having an inlet opening registering with the said outlet opening, and an inwardly opening gravity closed flap permitting passage into said rear cage and preventing exit therefrom.

3. A rat trap consisting of a cage like outer structure having an inlet opening at its front, the rear end of said cage having an outlet opening at a lower level than the inlet opening, an elevator cage vertically movable between the levels of said openings in the outer structure, a counterbalance normally holding the cage raised, a latch carried by said cage, a fixed member wherewith the latch engages upon the cage being raised whereby to restrain the cage from downward movement, release means for the latch including an animal actuated element mounted in said cage, a rear cage portion having an inlet opening registering with the said outlet opening, an inwardly opening gravity closed flap permitting passage into said rear cage and preventing exit therefrom, and a treadle in said rear cage in advance of said flap and having means for engaging and opening the flap upon depression of the treadle.

4. A rat trap consisting of a cage like outer structure having an inlet opening at its front, the rear end of said cage having an outlet opening at a lower level than the inlet opening, an elevator cage vertically movable between the levels of said openings in the outer structure, a counterbalance normally holding the cage raised, a latch carried by said cage, a fixed member wherewith the latch engages upon the cage being raised whereby to restrain the cage from downward movement, a bellcrank pivoted on said cage and having one end engaging the latch to move the same to release position, a treadle pivoted on the floor of the cage, a link connecting said treadle and bellcrank to operate the latter as the treadle is depressed, a rear cage portion having an inlet opening registering with the said outlet opening, an inwardly opening gravity closed flap permitting passage into said rear cage and preventing exit therefrom, and a treadle in said rear cage in advance of said flap and having means for engaging and opening the flap upon depression of the treadle.

In testimony whereof I affix my signature.

GEORGE F. FISHER.